United States Patent
Nobumoto et al.

(10) Patent No.: US 7,189,188 B2
(45) Date of Patent: Mar. 13, 2007

(54) TRANSMISSION CONTROL DEVICE

(75) Inventors: Hidetoshi Nobumoto, Hiroshima (JP); Tatsuya Uesugi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 134 days.

(21) Appl. No.: 10/774,455

(22) Filed: Feb. 10, 2004

(65) Prior Publication Data

US 2004/0157705 A1  Aug. 12, 2004

(30) Foreign Application Priority Data

Feb. 28, 2003 (JP) ............................... 2003-052366

(51) Int. Cl.
*B60W 10/02* (2006.01)
*B60K 41/02* (2006.01)

(52) U.S. Cl. .................... 477/176; 477/80; 192/3.54

(58) Field of Classification Search ................ 477/174, 477/176, 79–80; 701/55–6, 58; 192/3.54–5, 192/3.63
See application file for complete search history.

(56) References Cited

U.S. PATENT DOCUMENTS

| 5,400,678 | A | 3/1995 | Jain et al. |
| 5,704,871 | A | 1/1998 | Furukawa et al. |
| 5,816,979 | A * | 10/1998 | Shiiba et al. ............... 477/176 |
| 6,183,391 | B1 * | 2/2001 | Iijima ........................... 477/62 |
| 2002/0175036 | A1 * | 11/2002 | Takatori et al. .............. 192/3.3 |

FOREIGN PATENT DOCUMENTS

| JP | 02-057762 | 2/1990 |
| JP | 05-099296 | 4/1993 |
| JP | 08-233099 | 9/1996 |
| JP | 2000-304125 | 11/2000 |

* cited by examiner

*Primary Examiner*—Roger Pang
(74) *Attorney, Agent, or Firm*—Nixon Peabody LLP; Donald R. Studebaker

(57) ABSTRACT

In an automatic transmission including a forward clutch and a lockup clutch of a torque converter which are provided on a driving-power transmitting path between an engine and a driving wheel, a vehicle driving condition is classified into a plurality of regions and an associated slip control between the forward clutch and the lockup clutch is executed. Accordingly, both of improvements of gas mileage and drivability can be attained at a high level.

9 Claims, 14 Drawing Sheets

FIG. 13

| Region | Lockup Clutch (26) | Forward Clutch (51) |
|---|---|---|
| A, G | Lockup State | Slip State |
| B | Slip State | |
| C | Converter State | Slip State (non-steady condition) |
| | | Coupling State (weak coupling state) (steady condition) |
| D | Converter State | Coupling State (weak coupling state) |
| E | Slip State | |
| F | Lockup State | |
| N | Lockup State | Releasing State |

TRANSMISSION CONTROL DEVICE

BACKGROUND OF THE INVENTION

The present invention relates to a transmission control device.

For example, an automatic transmission for an automotive vehicle and the like is equipped with a hydraulic transmission device, such as a torque converter, provided on a driving-power transmitting path between an engine and driving wheels, in which there is provided a lockup clutch directly coupling an input element such as a pump with an output element such as a turbine. The lockup clutch is controlled according to a vehicle driving condition based on an engine load, a vehicle speed and so on such that, for instance, it is in a lockup state in a low engine-load and high vehicle-speed region, it is in a converter state in a high engine-load and low vehicle-speed region, and it is in a slip state in a low engine-load and middle vehicle-speed region. This control could improve gas mileage in the lockup state by a full (direct) coupling of the input element and the output element of the hydraulic transmission device, engine torque multiplication in the converter state by a full release of them, and both of gas mileage and drivability (i.e., absorption of shock or vibration due to a torque change) in the slip state by a half (partial) coupling of them. However, this kind of lockup clutch has a relatively large diameter, a piston chamber with a large volume, and a heavy piston, thereby providing a large vibration of its piston's face. Accordingly, this may cause disadvantages that its responsiveness, controllability and thereby controlling accuracy are inferior.

Meanwhile, it is known that there is provided other frictional coupling elements provided on the driving-power transmitting path between the engine and the driving wheel, which are controlled in a certain slip state respectively. Herein, the frictional coupling elements include, for example, the followings: clutches for achieving gear shift, such as a forward clutch, used for selecting a plurality of transmission gears by changing a driving-power transmitting path of a planetary gear mechanism; a starter clutch used for decreasing a rotation load of the engine by connecting or disconnecting the driving-power transmission between the engine and the fluid transmission device or between the fluid transmission device and the transmission; an forward-backward switching clutch used mainly along with a continuously variable transmission and for changing a rotational direction of an output of the transmission; a low-mode clutch and a high-mode clutch used along with the continuously variable transmission to enable a geared neutral and for changing the driving-power transmitting path to a low mode with a large gear ratio and a high mode with a small gear ratio respectively; and so on. Generally, this kind of frictional coupling elements have a relatively small diameter, a piston chamber with a small volume, and a light-weight piston, thereby providing a small vibration of its piston's face, compared with the lockup clutch of the hydraulic transmission device. Accordingly, they have advantages that its responsiveness, controllability and thereby control accuracy are superior.

For example, Japanese Patent Laid-Open Publication No. 2000-304125 discloses a control, referred to as a neutral control, that a frictional coupling element (forward clutch) for selecting a forward first-gear is controlled to be in a certain slip state during an idling stop with a D (drive) range in order to improve gas mileage and suppress an idling vibration. This control can reduce the load torque added to the engine by a reverse function of a creeping phenomena, thereby improving gas mileage and suppressing the idling vibration. Further, the U.S. Pat. No. 5,400,678 discloses a control that a frictional coupling element which is the weakest one, in other words, which requires the highest operating pressure, is controlled so as to be slightly slipped (to a certain extent that a durability of the frictional coupling element may not deteriorate: for example, 10 rpm) in order to achieve the best control of a line pressure and the best efficiency of transmission.

Herein, in the invention disclosed in the above-described Japanese patent publication, the slip control of the forward clutch is executed only when a vehicle stops, and the forward clutch is controlled in its lockup state when or after the vehicle starts. In the invention disclosed in the above-described US patent, the slip control of the frictional coupling element is executed in order to determine a certain line pressure, being increased gradually from the slip state, which can prevent the frictional coupling element from slipping. Namely, in these conventional ways, these slip controls of the frictional coupling element have been just executed in certain limited conditions and for certain limited purposes. An associated control between the slip control of the frictional coupling element and the slip control of the lockup clutch has not been executed.

Of course, it is known that the slip control of the frictional coupling element is executed for achieving the gear shift and the lockup clutch is made to slip for a short period of time in order to absorb a shock during gear shift. However, since the conventional controls did not perform so as to associate the slip control of the frictional coupling element with the slip control of the lockup clutch, they were unable to improve both of gas mileage and drivability (shock suppression and so on) properly.

SUMMARY OF THE INVENTION

The present invention has been devised in view of the above-mentioned problems, and an object of the present invention is to provide a transmission control device including a frictional coupling element and a lockup clutch of a hydraulic transmission device, which are provided on a driving-power transmitting path between an engine and a driving wheel and adaptive respectively to control a slip state between an input element and an output element thereof, which can improve both of gas mileage and drivability at a high level by associating the slip control of the frictional coupling element with the slip control of the lockup clutch in wide range.

In order to achieve the above-described object, the first aspect of the present invention provides a transmission control device including a frictional coupling element and a lockup clutch of a hydraulic transmission device, which are provided on a driving-power transmitting path between an engine and a driving wheel and adaptive respectively to control a slip state between an input element and an output element thereof, comprising a first control device for controlling a slip state of the frictional coupling element, a second control device for controlling a slip state of the lockup clutch, a driving condition detecting device for detecting a driving condition of a vehicle, a classification device for classifying the vehicle driving condition detected by the driving condition detecting device into a region, a determination device for determining when the vehicle is not at a gear shift timing, and an association control device for executing a control to associate the first control device with the second control device according to a classification result by the classification device, when it is determined by the determination device that the vehicle is not at the gear shift timing.

According to the transmission control device of the first aspect of the invention, when the vehicle is not at the gear shift timing, the association control of the first control device for controlling the slip state of the frictional coupling element and the second control device for controlling the slip state of the lockup clutch is executed according to the classification result of the vehicle driving condition. Accordingly, the slip controls of the frictional coupling element and the lockup clutch are executed in association therewith in wide rage according to, for example, an engine load and a vehicle speed and the like. As a result, this can improve both of gas mileage (which is attained by reducing a slip degree of the frictional coupling element and the lockup clutch) and drivability (which is attained by increasing a slip degree of the frictional coupling element and the lockup clutch to the contrary), which tend to be contrary to each other, at a high level.

Herein, the above-described associated slip control of the frictional coupling element and the lockup clutch is clearly distinguished from the conventional slip controls described above which may be executed only during the gear shift, in which the slip control of the frictional coupling element is executed for achieving gear shifting and the lockup clutch is made to slip for absorbing shift shock.

The second aspect of the present invention provides the transmission control device of the first aspect of the invention, wherein the association control device controls the first control device so as to make the frictional coupling element in a slip state and controls the second control device so as to make the lockup clutch in a lockup state, when the vehicle driving condition is classified into a first region by the classification device.

According to the transmission control device of the second aspect of the invention, since the frictional coupling element is made in the slip state and the lockup clutch is made in the lockup state in the first region, improvement of drivability can be attained by the control of the frictional coupling element and improvement of gas mileage can be attained by the control of the lockup clutch.

Next, the third aspect of the present invention provides the transmission control device of the first aspect of the invention, wherein the association control device controls the first control device so as to make the frictional coupling element in a slip state and controls the second control device so as to make the lockup clutch in a slip state, when the vehicle driving condition is classified into a second region by the classification device.

According to the transmission control device of the third aspect of the invention, since both of the frictional coupling element and the lockup clutch are made in the slip state respectively in the second region, improvement of drivability can be attained by the control of the frictional coupling element and both improvements of gas mileage and drivability can be attained by the control of the lockup clutch.

Next, the fourth aspect of the present invention provides the transmission control device of the first aspect of the invention, wherein the association control device controls the first control device so as to make the frictional coupling element in a slip state and controls the second control device so as to make the lockup clutch in a converter state, when the vehicle driving condition is classified into a third region by the classification device.

According to the transmission control device of the fourth aspect of the invention, since the frictional coupling element is made in the slip state and the lockup clutch is made in the converter state in the third region, improvement of drivability can be attained by the control of the frictional coupling element and a torque multiplication (aiming at increasing a driving power of the vehicle) can be attained by the control of the lockup clutch.

Next, the fifth aspect of the present invention provides the transmission control device of the first aspect of the invention, wherein the control of the first control device includes a control to adjust a slip degree of the frictional coupling element at a specified target slip.

According to the transmission control device of the fifth aspect of the invention, since the frictional coupling element is maintained in the target-slip state, improvement of drivability can be attained by the control of the frictional coupling element.

Next, the sixth aspect of the present invention provides the transmission control device of the first aspect of the invention, wherein the control of the first control device includes a control to make the frictional coupling element in a weak coupling state so as to allow it to slip when an instantaneous torque changing occurs.

According to the transmission control device of the sixth aspect of the invention, since the frictional coupling element is made in the weak coupling state so as to allow it to slip when the instantaneous torque changing occurs, improvement of drivability attained by the control of the frictional coupling element can be obtained securely when it is required.

Next, the seventh aspect of the present invention provides the transmission control device of the second aspect of the invention, wherein the first region corresponds to a vehicle driving condition where an engine load is lower than a specified engine load in a relatively low-load area and a vehicle speed is lower than a specified vehicle speed in a relatively low-speed area, and/or a vehicle deceleration condition where the engine load is extremely low.

According to the transmission control device of the seventh aspect of the invention, the first region referred to in the second aspect of the invention is materialized and both of the drivability improvement by the frictional coupling element and the gas mileage improvement by the lockup clutch can be attained at a high level in the regions of low-load and low-speed vehicle driving condition and/or the vehicle deceleration condition.

Next, the eighth aspect of the present invention provides the transmission control device of the third aspect of the invention, wherein the second region corresponds to a vehicle driving condition where an engine load is higher than a specified engine load in a relatively low-load area and lower than a specified engine load in a relatively high-load area and a vehicle speed is lower than a specified vehicle speed in a relatively low-speed area.

According to the transmission control device of the eighth aspect of the invention, the second region referred to in the third aspect of the invention is materialized and both of the drivability improvement by the frictional coupling element- and improvements of gas mileage and drivability by the lockup clutch can be attained at a high level in the region of medium-load and low-speed vehicle driving condition.

Next, the ninth aspect of the present invention provides the transmission control device of the fourth aspect of the invention, wherein the third region corresponds to a vehicle driving condition where an engine load is higher than a specified engine load in a relatively high-load area and a vehicle speed is lower than a specified vehicle speed in a relatively low-speed area.

According to the transmission control device of the ninth aspect of the invention, the third region referred to in the fourth aspect of the invention is materialized and both of the drivability improvement by the frictional coupling element and the torque multiplication by the lockup clutch can be attained at a high level in the region of high-load and low-speed vehicle driving condition.

Next, the tenth aspect of the present invention provides the transmission control device of the sixth aspect of the invention, wherein a region where the frictional coupling element is made in the weak coupling state corresponds to a vehicle driving condition where an engine load is higher than a specified engine load in a relatively high-load area and/or a vehicle speed is higher than a specified vehicle speed in a relatively low-speed area.

According to the transmission control device of the tenth aspect of the invention, the region where the frictional coupling element is made in the weak coupling state referred to as the sixth aspect of the invention is materialized, and the drivability improvement attained by the slip control of the frictional coupling element can be obtained securely when it is required at the time the instantaneous torque changing occurs in the region of high-load or medium-through-high-speed vehicle driving condition.

Next, the eleventh aspect of the present invention provides a transmission control device including a frictional coupling element and a lockup clutch of a hydraulic transmission device, which are provided on a driving-power transmitting path between an engine and a driving wheel and adaptive respectively to control a slip state between an input element and an output element thereof, comprising a first control device adaptive to control a slip state of the frictional coupling element, a second control device adaptive to control a slip state of the lockup clutch, a driving condition detecting sensor adaptive to detect a driving condition of a vehicle, and a control unit which receives a detecting signal of the driving condition detecting sensor and generates a control signal to the first and second control devices, wherein the control unit includes classification section for classifying the vehicle driving condition detected by the driving condition detecting sensor into a region, determination section for determining when the vehicle is not at a gear shift timing, and association control section for executing a control to associate the first control device with the second control device according to a classification result by the classification section when the vehicle is not at the gear shift timing.

According to the transmission control device of the eleventh aspect of the invention, substantially the same functions and effects as the first aspect of the invention can be obtained.

Next, the twelfth aspect of the present invention provides the transmission control device of the eleventh aspect of the invention, wherein the first control device is controlled so as to make the frictional coupling element in a slip state and the second control device is controlled so as to make the lockup clutch in a lockup state, when the vehicle driving condition is classified into a first region corresponding to a vehicle driving condition where an engine load is lower than a specified engine load in a relatively low-load area and a vehicle speed is lower than a specified vehicle speed in a relatively low-speed area, and/or a vehicle deceleration condition where the engine load is extremely low.

According to the transmission control device of the twelfth aspect of the invention, substantially the same functions and effects as the second and seventh aspects of the invention can be obtained.

Next, the thirteenth aspect of the present invention provides the transmission control device of the eleventh aspect of the invention, wherein the first control device is controlled so as to make the frictional coupling element in a slip state and the second control device is controlled so as to make the lockup clutch in a slip state, when the vehicle driving condition is classified into a second region corresponding to a vehicle driving condition where an engine load is higher than a specified engine load in a relatively low-load area and lower than a specified engine load in a relatively high-load area and a vehicle speed is lower than a specified vehicle speed in a relatively low-speed area.

According to the transmission control device of the thirteenth aspect of the invention, substantially the same functions and effects as the third and eights aspects of the invention can be obtained.

Next, the fourteenth aspect of the present invention provides the transmission control device of the eleventh aspect of the invention, wherein the first control device is controlled so as to make the frictional coupling element in a slip state and the second control device is controlled so as to make the lockup clutch in a converter state, when the vehicle driving condition is classified into a third region corresponding to a vehicle driving condition where an engine load is higher than a specified engine load in a relatively high-load area and a vehicle speed is lower than a specified vehicle speed in a relatively low-speed area.

According to the transmission control device of the fourteenth aspect of the invention, substantially the same functions and effects as the fourth and ninth aspects of the invention can be obtained.

Next, the fifteenth aspect of the present invention provides the transmission control device of the eleventh aspect of the invention, wherein the first control device is controlled so as to make the frictional coupling element in a slip state and the second control device is controlled so as to make the lockup clutch in a lockup state, when the vehicle driving condition is classified into a first region corresponding to a vehicle driving condition where an engine load is lower than a specified engine load in a relatively low-load area and a vehicle speed is lower than a specified vehicle speed in a relatively low-speed area, and/or a vehicle deceleration condition where the engine load is extremely low, the first control device is controlled so as to make the frictional coupling element in the slip state and the second control device is controlled so as to make the lockup clutch in the slip state, when the vehicle driving condition is classified into a second region corresponding to a vehicle driving condition where the engine load is higher than the specified engine load in the relatively low-load area and lower than a specified engine load in a relatively high-load area and the vehicle speed is lower than the specified vehicle speed in the relatively low-speed area, and the first control device is controlled so as to make the frictional coupling element in the slip state and the second control device is controlled so as to make the lockup clutch in a converter state, when the vehicle driving condition is classified into a third region corresponding to a vehicle driving condition where the engine load is higher than the specified engine load in the relatively high-load area and the vehicle speed is lower than the specified vehicle speed in the relatively low-speed area.

According to the transmission control device of the fifteenth aspect of the invention, substantially the same functions and effects as the twelfth through fourteenth aspects of the invention can be obtained.

BRIEF DESCRIPTION OF THE DRAWINGS

Other features, aspects, and advantages of the present invention will be apparent from the following description of the present invention which refers to the accompanying drawings.

FIG. 13 is a table summarizing a control content for each classified region.

DETAILED DESCRIPTION OF THE INVENTION

Figure 1:
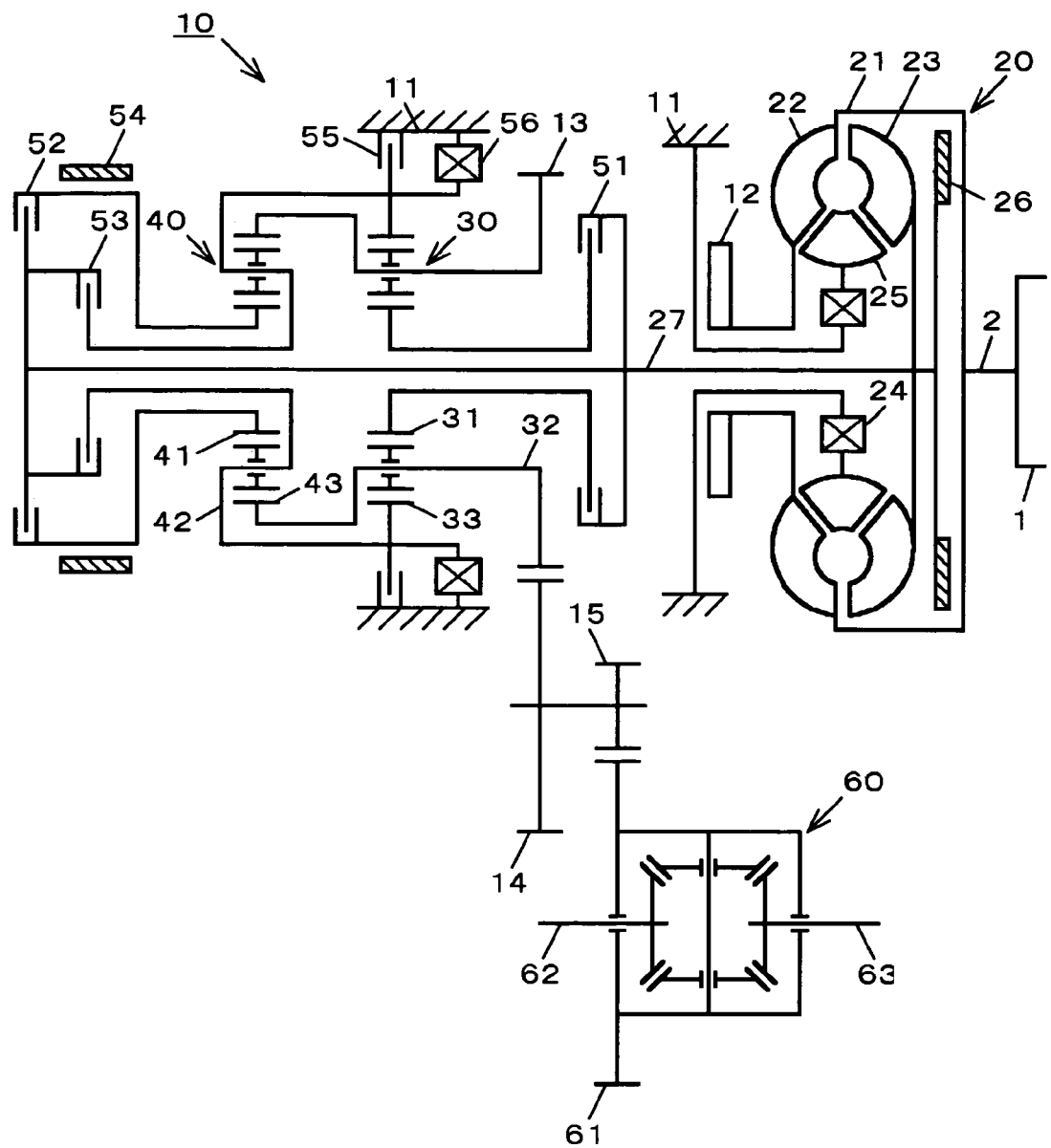
FIG. 1 is a skeleton diagram of an automatic transmission according to a preferred embodiment of the present invention.

The present invention is applied to an automatic transmission 10 shown in FIG. 1 in a preferred embodiment. The automatic transmission 10 comprises a torque converter 20 receiving an output of an engine 1, which functions as a hydraulic transmission device, and two sets of planetary gear mechanisms 30, 40 receiving an output of the torque converter 20. The automatic transmission 10 is controlled by selective operations of a plurality of frictional coupling elements 51 through 55 and a one-way clutch 56, which perform as clutches and brakes operative to change driving-power transmitting paths of the planetary gear mechanisms 30, 40, so that 1st–4th gears in a D range, 1st–3rd gears in a S range, 1st–2nd gears in a L range and a reverse gear in a R range can be selected as shown in Table 1 (○ means an operation in the Table).

TABLE 1

| | Forward Clutch (51) | Reverse Clutch (52) | 3–4 Clutch (53) | 2–4 Brake (54) | Low Reverse Brake (55) | One-way Clutch (56) |
|---|---|---|---|---|---|---|
| | | | | | (○) is operated only in L range. | |
| 1st gear | ○ | | | | (○) | ○ |
| 2nd gear | ○ | | | ○ | | |
| 3rd gear | ○ | | ○ | | | |
| 4th gear | | | | ○ | ○ | |
| Reverse | | ○ | | | ○ | |

The torque converter 20 includes a case 21 coupled to an engine output shaft 2, a pump 22 fixed to the case 21 which functions as an input element, a turbine 23 disposed facing against the pump 22 which functions as an output element, and a stator 25 disposed between the pump 22 and the turbine 23. A rotation of the turbine 25 is conveyed to the planetary mechanisms 30, 40 through a turbine shaft 27. The stator 25 is supported on a transmission case 11 via a one-way clutch 24 so as to perform a torque multiplication function. The torque converter 20 includes a lockup clutch 26 coupling directly the pump 22 with the turbine 23, as described below in detail. Further, there is provided a hydraulic pump 12 driven by the engine 1 via the converter case 21.

There are provided a forward clutch 51 between the turbine shaft 27 and a sun gear 31 of the first planetary gear mechanism 30, a reverse clutch 52 between the turbine shaft 27 and a sun gear 41 of the second planetary gear mechanism 40, and a 3–4 clutch 53 between the turbine shaft 27 and a carrier 42 of the second planetary gear mechanism 40. A 2–4 brake 54 is operative to lock the sun gear 41 of the second planetary mechanism 40. A ring gear 33 of the first planetary gear mechanism 30 is coupled to the carrier 42 of the second planetary gear mechanism 40, and a low reverse gear 55 and an one-way clutch 56 are arranged in a row between these members and the transmission case 11. A carrier 32 of the first planetary gear mechanism 30 and a ring gear 43 of the second planetary gear mechanism 40 are coupled to each other, which are connected an output gear 13. The output gear 13 is in mesh with an input gear 61 of a differential gear 60 via of two counter gears 14, 15. A rotation of the output gear 13 is conveyed via the differential gear 60 and left and right axles 62, 63 to driven wheels of the vehicle, which is not shown in any drawings.

Figure 2:
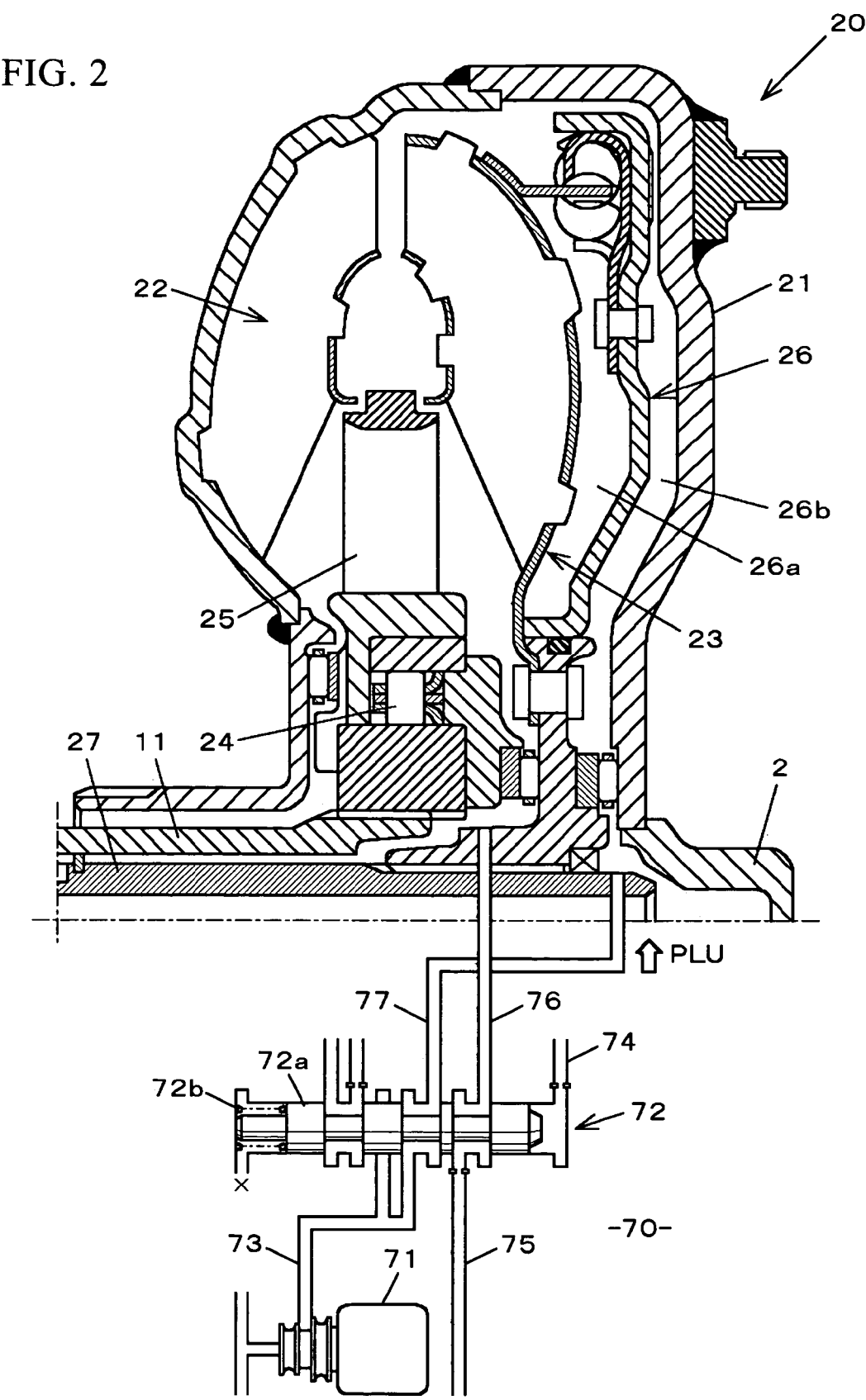
FIG. 2 is a structural diagram for showing a torque converter and a hydraulic control circuit for a lockup clutch of the automatic transmission.

As shown in FIG. 2, the lockup clutch 26 of the torque converter 20 is located between the converter case 21 and the turbine 23. The lockup clutch 26 is adaptive to couple directly the engine output shaft 2 with the turbine shaft 27 via the converter case 21. The lockup clutch 26 is fixed to the turbine 23, and its is pushed in its connecting direction by a hydraulic operating pressure in a connecting chamber 26a of the converter case 21, while pushed in its releasing direction by a hydraulic operating pressure in a releasing chamber 26a.

In a hydraulic control circuit 70 of the lockup clutch 26, there are provided a duty solenoid valve 71 and a shift valve 72 which function as control means for controlling a slip state of the lockup clutch 26. The shift valve 72 is connected with a supply line 73 for a control pressure adjusted by the duty solenoid valve 71, a supply line 74 for a pilot pressure, a supply line 75 for a converter pressure adjusted at a constant pressure, a connecting pressure line 76 leading to the connecting chamber 26a of the lockup clutch 26, and a releasing pressure line 77 leading to the releasing chamber 26b. When the pilot pressure is supplied through the pilot pressure line 74, as shown in the figure, a spool 72a of the shift valve 72 is located at the left side in the figure against a force of a spring 72b, and the connecting pressure line 76 is connected with the converter pressure line 75 and the releasing pressure line 77 is connected with the control pressure line 73 respectively. Accordingly, the converter pressure is used for the connecting hydraulic pressure, and the control pressure is used for the releasing hydraulic pressure, respectively.

In this state, when a duty ratio (a rate of ON time in one ON-OFF cycle) impressed to the duty solenoid valve 71 is increased, the control pressure (releasing hydraulic pressure) PLU decreases. As a result, the connecting force of the lockup clutch 26 increases, and finally the lockup clutch is locked fully (lockup state). Meanwhile, when the duty ratio is decreased, the control pressure PLU increases. As a result, so that the connecting force of the lockup clutch 26 decreases, and finally the lockup clutch is released (unlocked) fully (converter state). Further, the control pressure PLU or the connecting force of the lockup clutch 26 is adjusted by controlling the duty ratio between the states, and thereby the lockup clutch is controlled at a partially connected state (slip state).

In the present embodiment, at least the forward clutch 51 among plural frictional coupling elements 51–55 for achieving the gear shift is configured, like the lockup clutch 26 of the torque converter 20, so as to control the slip state between its input element and its output element thereof. Herein, since the forward clutch 51 is coupled (locked) only at 1st–3rd gears, shown in the above-described Table 1, in the present embodiment, the 3–4 clutch 53 adaptive to be coupled (locked) at 3rd and 4th gears is also configured so as to so as to control the slip state between its input element and its output element thereof to cover 4th gear. Hereinafter, although the forward clutch 51 will be described as a sample, the 3–4 clutch 53 is basically the same as this unless there are any descriptions to the contrary.

Figure 3:
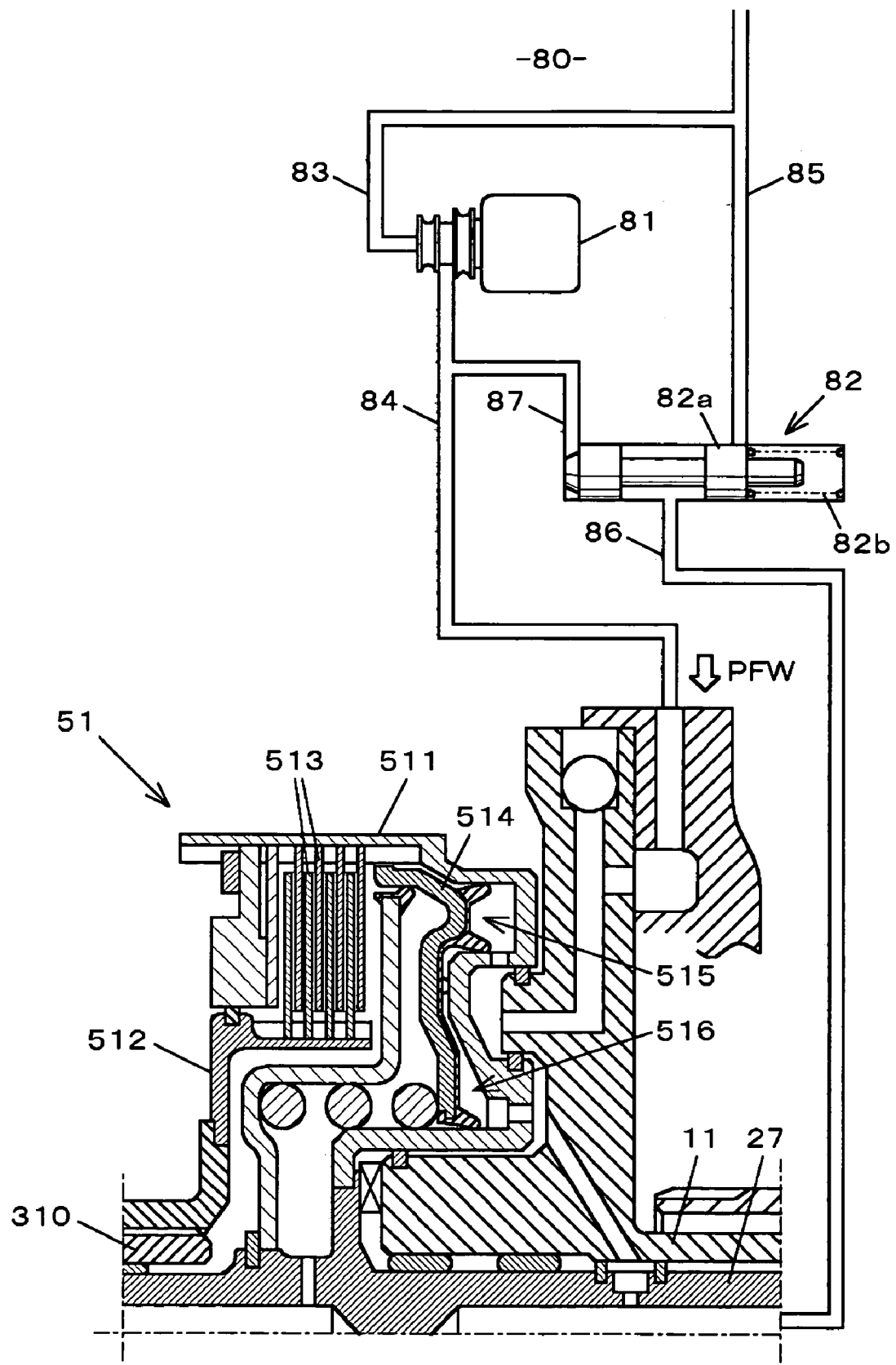
FIG. 3 is a structural diagram for showing a forward clutch of the automatic transmission and a hydraulic control circuit thereof.

As shown in FIG. 3, the forward clutch 51 includes a drum 511 functioning as the input element fixed to the turbine shaft 27, a hub 512 functioning as the output element in mesh with a member 310 of the sun gear 31 of the first planetary gear mechanism 30, a plurality of friction plates 513 . . . 513 in mesh with the drum 511 and the hub 512 respectively, and a piston 514 supported movably in an axis direction within the drum 511. An outside connecting chamber 515 and an inside connecting chamber 516 are formed between the piston 514 and the drum 511.

There are provided a duty solenoid valve 81 and a shift valve 82 in the hydraulic pressure control circuit 80 of the forward clutch 51, which function as control means for controlling the slip state of the forward clutch 51. The duty solenoid valve 81 is connected with a supply line 83 for a line pressure and an outside connecting pressure line 84 leading to the above-described outside connecting chamber 515. Likewise, the shift valve 82 is connected with a supply line 85 for the line pressure, an inside connecting pressure line 86 leading to the above-described inside connecting chamber 515, and further a supply line 87 for a control pressure adjusted by the duty solenoid valve 81. When no control pressure is supplied to the shift valve 82 via the control pressure supply line 87, a spool 82a of the shift valve 82 is located at the left side in the figure by a spring force of a spring 82b as shown in the figure, and thereby the line pressure supply line 85 and the inside connecting pressure line 86 are disconnected.

In this state, when a duty ratio impressed to the duty solenoid valve 81 is decreased, the control pressure (outside connecting hydraulic pressure) PFW increases. As a result, the forward clutch 51 performs its connecting movement relatively slowly, receiving the hydraulic pressure in only its outside connecting chamber 515. Herein, the spool 82a of the shift valve 82 moves toward the right side in the figure against the spring force of the spring 82b, receiving the control pressure as well. According to the right-side movement of the spool 82a, the line pressure supply line 85 and the inside connecting pressure line 86 come to be connected. Then, the operating pressure (inside connecting hydraulic pressure) with a magnitude of pressure according to an extent of connection between them is supplied to the inside connecting chamber 516, and the forward clutch 51 perform its connecting movement relatively fast, receiving the hydraulic pressure in the both connecting chambers 515, 516. Accordingly, the connecting force of the forward clutch 51 can be adjusted accurately and thereby the slip control of the forward clutch 51 can be performed accurately by controlling the duty ratio of the duty solenoid valve 81 within a scope where only the outside connecting hydraulic pressure PFW is supplied to the forward clutch 51, in other word, in a state where the line pressure supply line 85 and the inside connecting pressure line 86 are disconnected by the shift valve 82.

Figure 4:
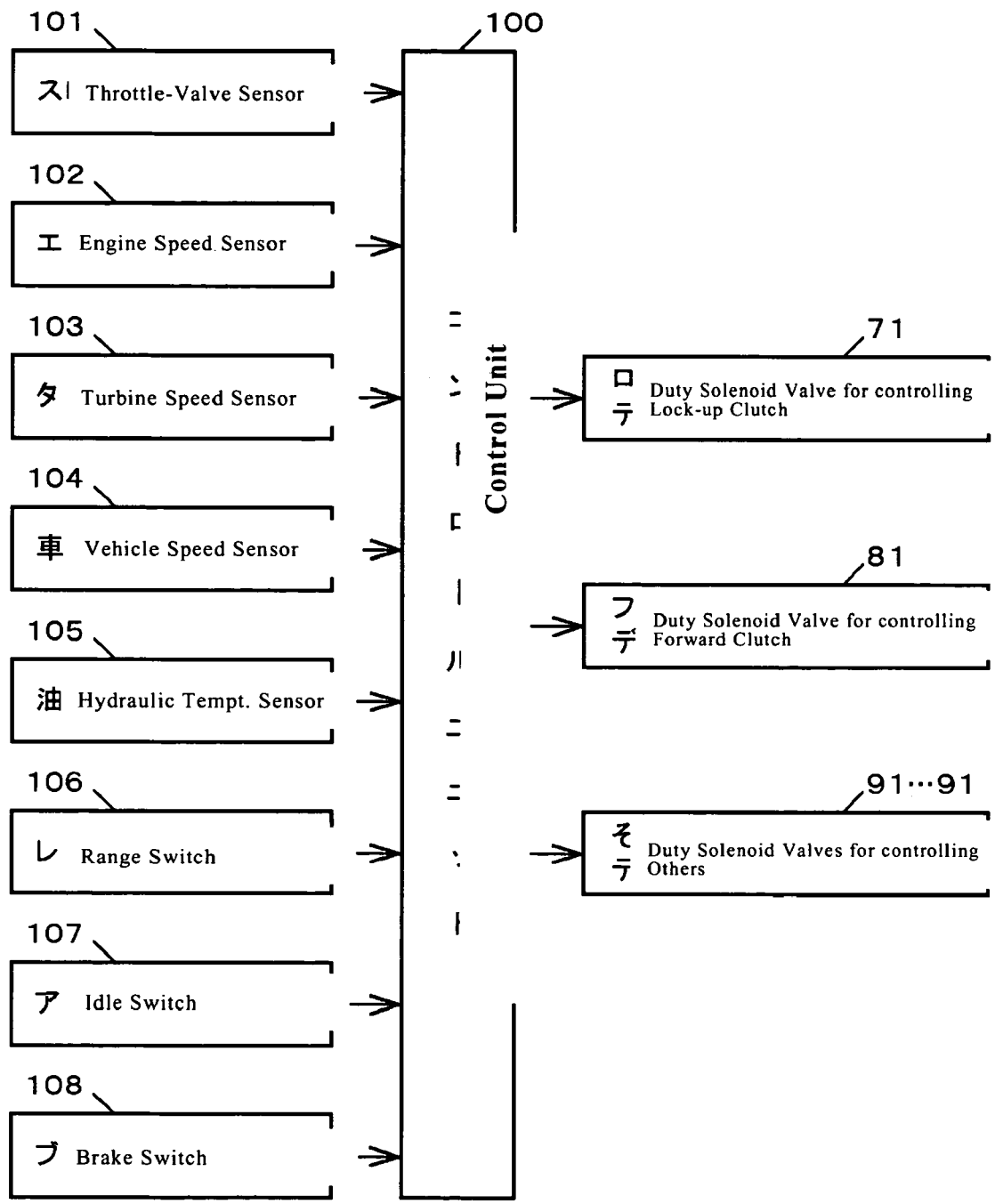
FIG. 4 is a structural diagram for showing a control system of the automatic transmission.

As shown in FIG. 4, a control unit 100 of the automatic transmission 10 receives signals from the following sensors or switches: a throttle opening sensor 101 to detect an throttle-valve opening of the engine 1; an engine speed sensor 102 to detect a rotational speed Ne of the engine output shaft 2 as an engine speed; an turbine speed sensor 103 to detect a rotational speed Nt of the turbine shaft 27 as a turbine speed; a vehicle speed sensor 104 to detect a rotational speed of the output gear 13 (outputs of the planetary gear mechanisms 30, 40) as a vehicle speed; a hydraulic temperature sensor 105 to detect a temperature of an operating hydraulic fluid (oil); a range switch 106 adaptive to generate an ON signal according to a range selected by a driver; an idle switch 107 adaptive to generate an ON signal when the driver does not depress an accelerator pedal; a brake switch 108 adaptive to generate an ON signal when the driver depresses a brake pedal; and the like. The control unit 100 sets a target gear to be shifted and then generate control signals to the above-described duty solenoid valves 81, 91 . . . 91 for controlling gear shift to supply or discharge the operating pressure for the frictional coupling elements 51–55 so as to select the target gear, according to a vehicle driving condition (particularly, throttle-valve opening and vehicle speed) detected by the above-described sensors and switches. Further, when the gear shift control is not executed, the control unit 100 classifies the vehicle driving condition (particularly, throttle opening and vehicle speed) detected by the sensors and switches into a plurality of regions and generates control signals to the duty solenoid valve 71 for controlling the lockup clutch and the duty solenoid valve 81 for controlling the forward clutch based on results of the classification so as to associate the slip control by the lockup clutch 26 with the slip control by the forward clutch 51.

Hereinafter, an exemplified specific manner of the above-described associated control will be described referring to flowcharts of FIGS. 5 through 7. First, the control unit 100 detects a vehicle driving condition based on the input signals of the above-described sensors and switches 101–108 in step S1. Then, it is determined whether P or N range, or non-driving range is selected or not in step S2. When the answer is NO, namely a driving range such as D range is selected, the sequence proceeds to step S3 where it is determined whether or not the vehicle driving condition is a deceleration one, namely whether the accelerator pedal is not depressed. When the answer is NO, that is, the accelerator pedal is depressed in step S3, the sequence proceeds to step S4. In step S4, it is determined whether or not the vehicle driving condition is a steady one, namely control parameters of the engine 1 progress steadily without any big changes. When the answer is YES with the steady driving condition in step S4, the sequence proceeds to step S5. Meanwhile, when the answer is NO with a non-steady driving condition (for example, a transitional condition, such as a starting condition or an acceleration condition), it proceeds to step S6.

Figure 8:
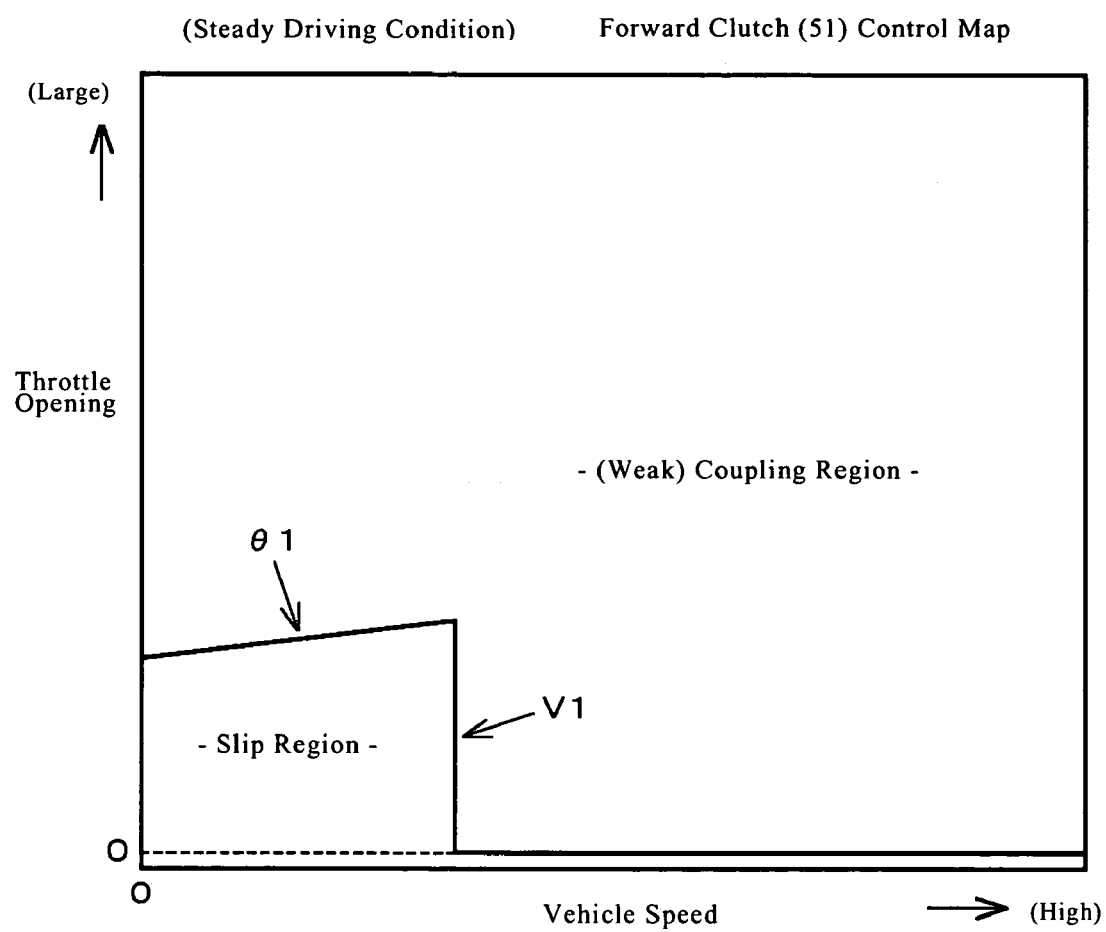
FIG. 8 is an exemplified control map for a steady driving condition which is used to set a control region for the forward clutch.
Figure 9:
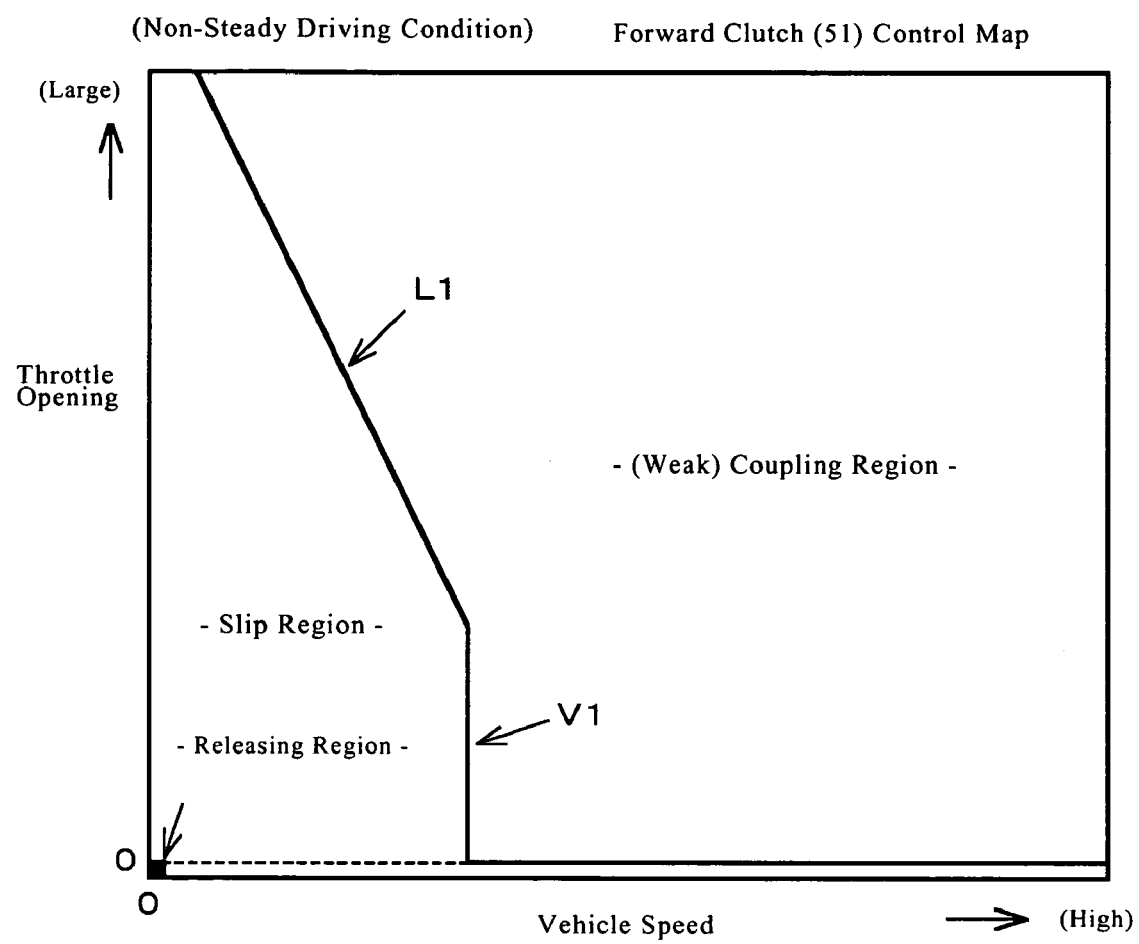
FIG. 9 is an exemplified control map for a ion-steady driving condition which is used to set the control region for the forward clutch.

A control region for the forward clutch 51 is set based on a control map for a steady driving condition in step S5, while the control region for the forward clutch 51 is set based on a control map for a non-steady driving condition in step S6. Herein, an exemplified control map for steady driving condition is shown in FIG. 8, and an exemplified control map for non-steady driving condition is shown in FIG. 9. Each of coupling region to couple (lock) the forward clutch 51 and slip region to slip the forward clutch 51 is predetermined based on the vehicle speed and the throttle-valve opening, one of parameters representing the engine load, in both maps.

In the steady condition control map of FIG. 8, the slip region is defined as a region where the throttle-valve opening is lower than a specified throttle opening $\theta1$ in a relatively low throttle-valve opening area and the vehicle speed is lower than a specified vehicle speed V1 in a relatively low vehicle-speed area. The specified vehicle speed V1 is constant with respect to the throttle-valve opening, while the specified throttle opening $\theta1$ increases as the vehicle speed increases (increasing tendency). In the non-steady condition control map of FIG. 9, the slip region is expanded toward a large throttle-valve opening area, compared with the steady condition control map. Herein, a vehicle speed L1 to define a border between the slip region and the coupling region decreases as the throttle opening increases.

In the present embodiment, the forward clutch 51 is made to be in a weak coupling state in the above-described region (a hydraulic pressure to achieve that state is predetermined based on engine load and speed). As a result, when a torque via the forward clutch 51 changes rapidly, the forward clutch 51 slips in a moment to absorb shock or vibration due to the torque changing. Meanwhile, the forward clutch 51 is feedback controlled so that the slip degree can be maintained at a specified target slip in the slip region. Further, as shown in FIGS. 8 and 9, a deceleration condition where the throttle-valve opening is extremely small (i.e., fully closed or near a zero opening) is set to be the slip region in a whole vehicle speed area.

Figure 5:
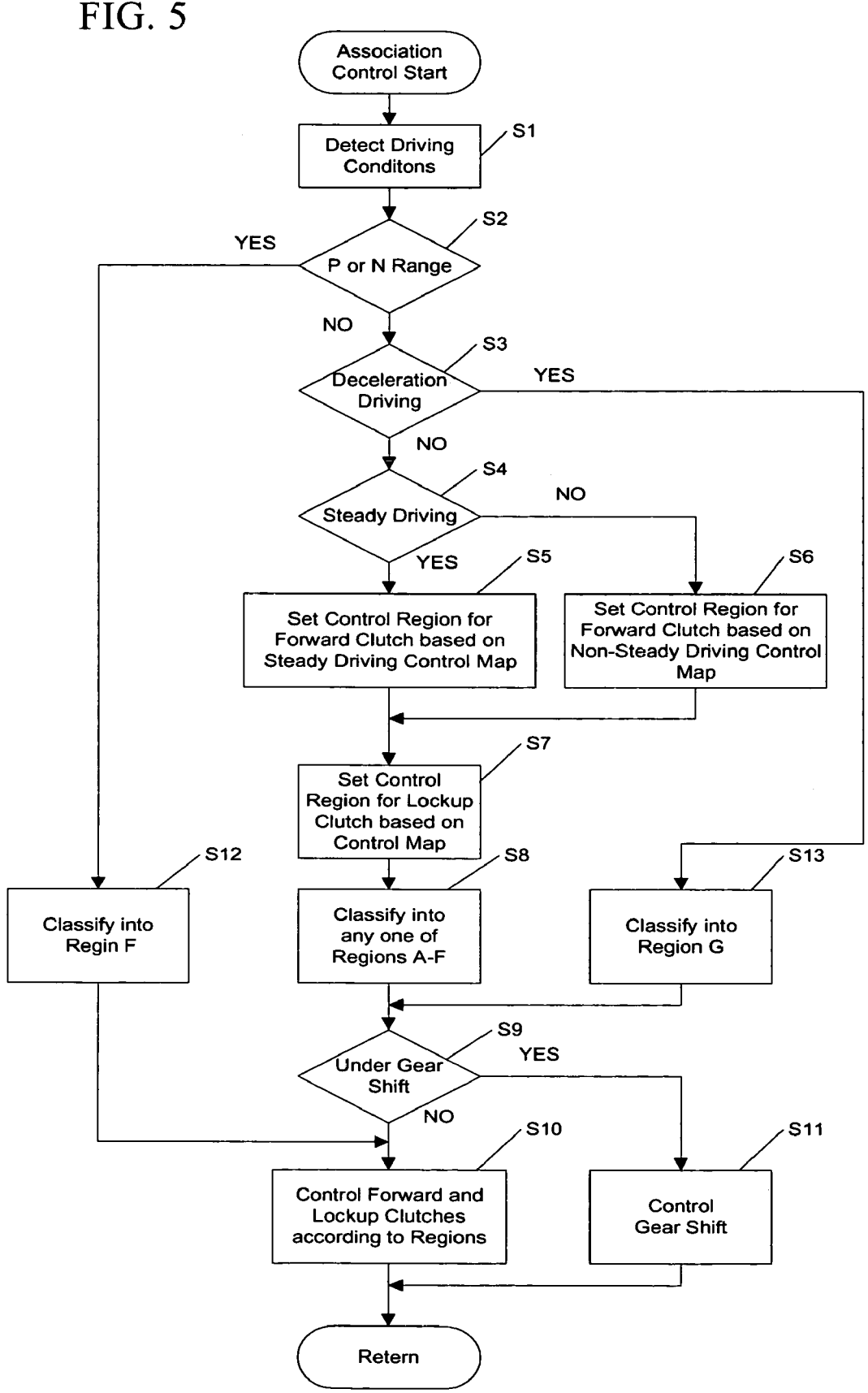
FIG. 5 is an exemplified flowchart for an association control of a slip control for the lockup clutch and a slip control for the forward clutch.
Figure 10:
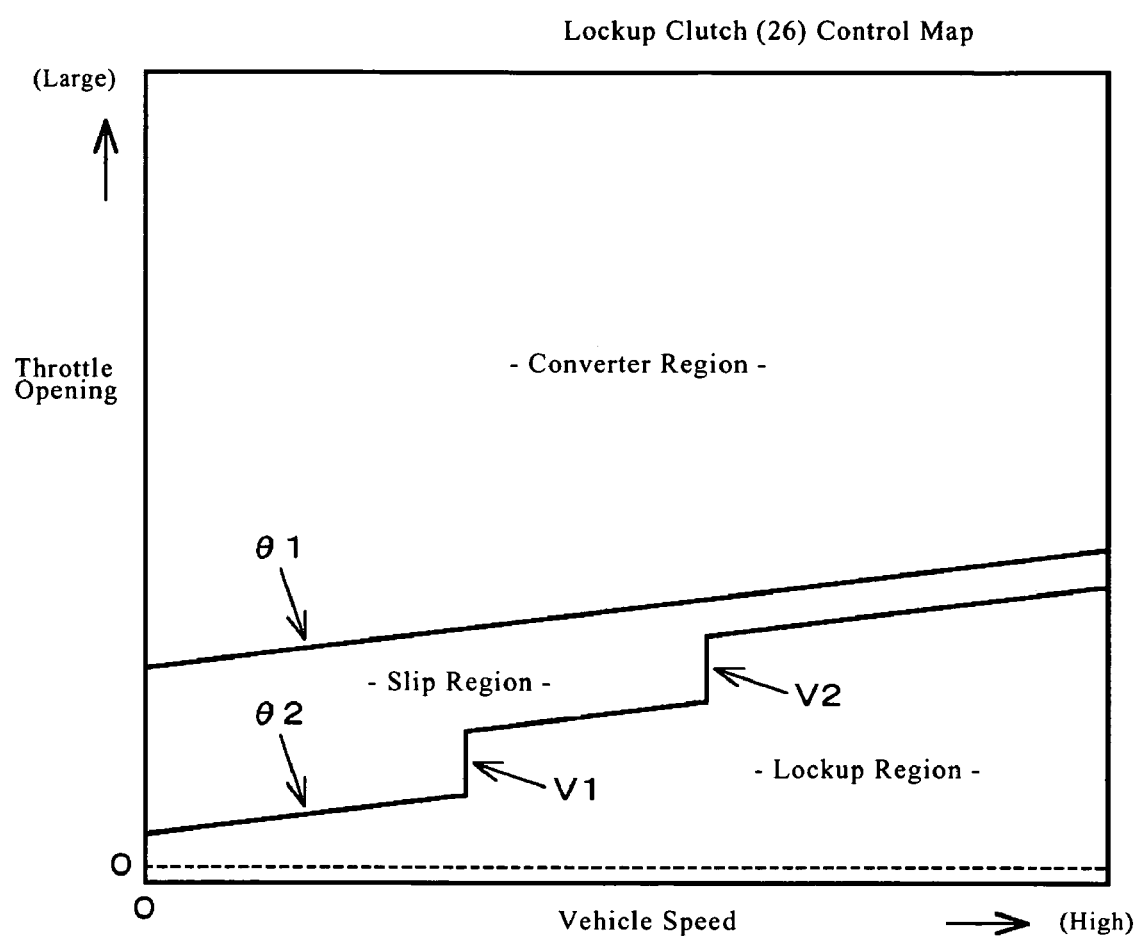
FIG. 10 is an exemplified control map which is used to set a control region for the lockup clutch.

Returning to the flowchart of FIG. 5, the control unit 100 sets the control region for the forward clutch 51 in steps S5 and S6 as described above, and then sets a control region for the lockup clutch 26 based on the control map in step S7. An exemplified control map is shown in FIG. 10. In the control map for the lockup clutch 26, a lockup region to lock fully the lockup clutch 26, a converter region to release (unlock) fully it, and a slip region to couple partially it are predetermined based on the vehicle speed and the throttle-valve opening, one of parameters representing the engine load, like the control map for the forward clutch 51 shown in FIGS. 8 and 9.

In the control map of FIG. 10, the lockup region is defined as a region where the throttle-valve opening is lower than a specified throttle opening $\theta2$ in the relatively low throttle-vale opening area in a whole vehicle speed area, regardless of the vehicle speed. Herein, the second specified throttle opening $\theta2$ is set so as to be smaller than the first specified throttle opening $\theta1$ to define the slip region for the forward clutch 51 shown in FIGS. 8 and 9. The second specified throttle opening $\theta2$ increases as the vehicle speed increases as well as the first specified throttle opening $\theta1$. Here, the second specified throttle opening $\theta2$ has a difference in magnitude at the specified vehicle speed V1, which defines the slip region for the forward clutch 51 shown in FIGS. 8 and 9, and a specified vehicle speed V2, which is higher than the specified vehicle speed V1. However, this characteristic is just an example and the one without such a difference in magnitude can be applied. Further, as shown in FIG. 10, the deceleration condition with the extreme small throttle openings (i.e., fully closed or near a zero opening) is set as the lockup region in the whole vehicle speed area, regardless of the vehicle speed.

In the control map of FIG. 10, the slip region is also set in the whole vehicle speed area regardless of the vehicle speed. Here, the slip region is defined as a region between the first specified throttle opening $\theta1$ and the second specified throttle opening $\theta2$.

Figure 11:
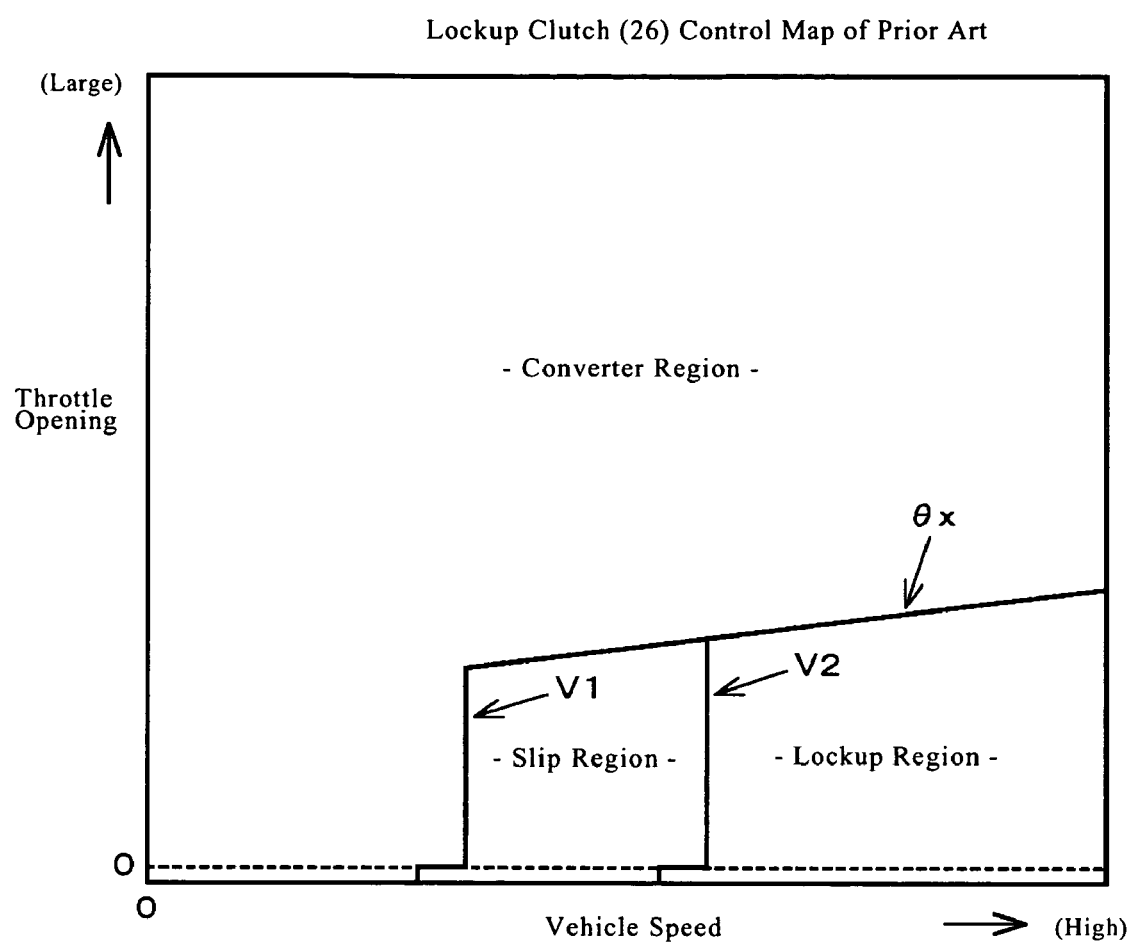
FIG. 11 is a conventional control map in prior art which is used to set a control region for the lockup clutch.

Herein, a control map for a lockup clutch in prior art is shown in FIG. 11 for a comparison. Namely, this is a case in which the slip control is executed only for the lockup clutch of the torque converter, and other frictional coupling elements such as the forward clutch do not execute their slip control in a wide area according to the vehicle driving condition.

In the prior art control map of FIG. 11, the lockup region is defied as a region where the throttle-valve opening is smaller than a specified throttle opening $\theta x$ in a relatively small throttle-vale opening area and the vehicle speed is higher than the above-described second specified vehicle speed V2 in a relatively high vehicle-speed area. Herein, the specified throttle opening $\theta x$ is substantially equal to the second specified throttle opening $\theta2$ shown in FIG. 10. The slip region is defined as a region where the throttle valve opening is smaller than the specified throttle opening $\theta x$ in the relatively small throttle-vale opening area, and the vehicle speed is between the above-described first specified vehicle speed V1 in the relatively slow vehicle-speed area and the above-described second specified vehicle speed V2 in the relatively high vehicle-speed area. Further, a region corresponding to the deceleration condition with extremely small throttle openings (i.e., fully closed or near a zero opening) is divided into a converter region, a slip region, and a lockup region, in order of the vehicle speed.

Namely, the control map of FIG. 10 used in the present embodiment of the present invention has an enlarged scope of the lockup region and the slip region, and a reduced scope of the converter region, compared with the prior art control map of FIG. 11. A main reason for this is that the forward clutch 51 is controlled so as to slip in the whole vehicle driving condition (however, this is limited to the 1st–3rd gears in the present embodiment as described above, and the 4th gear is covered by the 3–4 clutch 53) as shown in FIGS. 8 and 9. That is, the forward clutch 51 is feedback controlled in the slip region so that the slip degree thereof can be maintained at the specified target slip (except for a zero slip) in the steady and non-steady driving conditions as described above. Meanwhile, in the coupling region, the forward clutch 51 is controlled so as to be in the weak coupling state (aiming at zero slip degree), allowing the slip only when the instantaneous torque changing occurs. Accordingly, the shock or vibration due to instantaneous torque changing can be absorbed by a natural (spontaneous) slip of the forward clutch 51 in the whole driving condition. And, particularly in the relatively low vehicle-speed area, the forward clutch 51 is controlled actively so as to slip and thus such shock or vibration due to torque changing, which tends to be noticeable in this driving area, can be absorbed securely and appropriately.

Accordingly, since it is configured such that the forward clutch 51 deals with improving the drivability (absorption of shock or vibration due to torque changing) in the whole driving area, the scope of the converter region of the lockup clutch 26 can be reduced and thereby the gas mileage can be improved by the lockup clutch 26 as much as possible.

Figure 12:
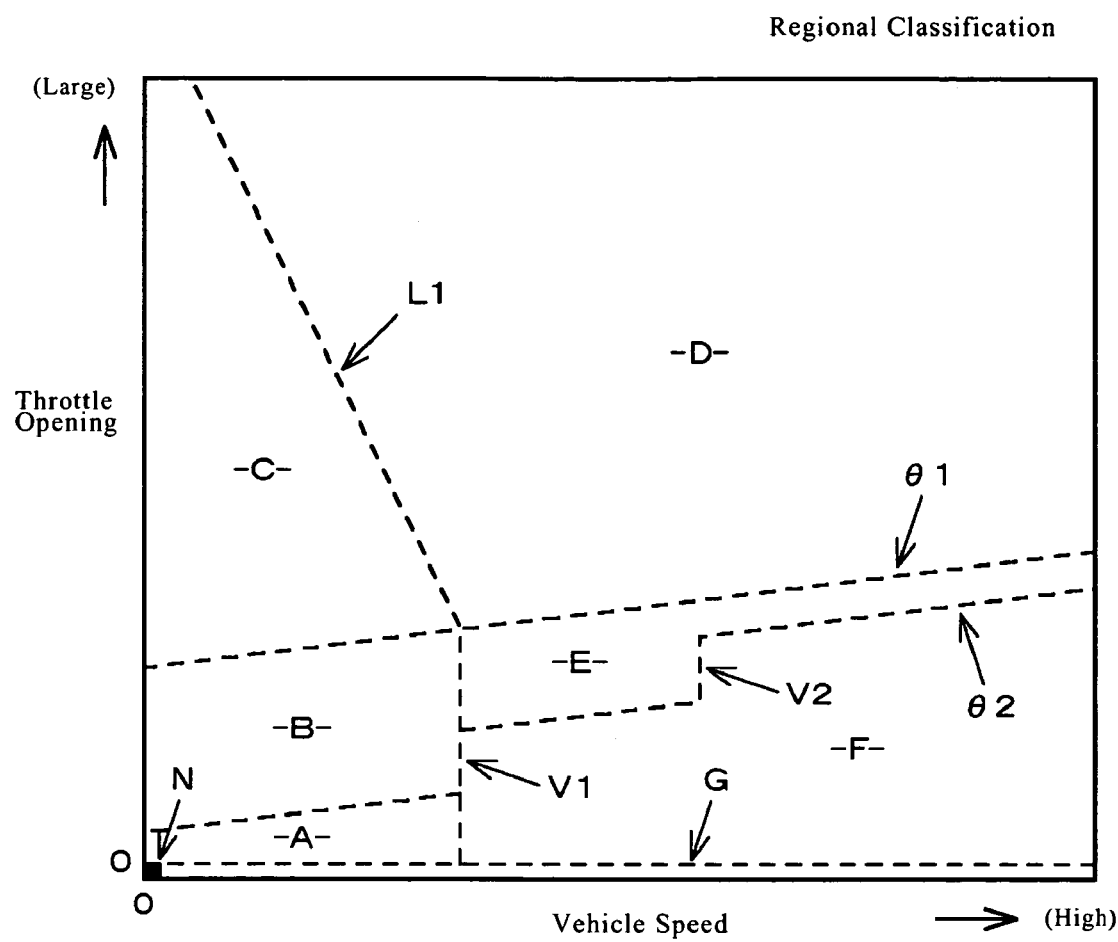
FIG. 12 is an exemplified regional classification map which is used for a regional classification of a vehicle driving condition.

Again, returning to the flowcharts of FIG. 5, the control unit 100 classifies the vehicle driving condition into plural regions A through F based on a regional classification map in step S8, after setting the control region of the lockup clutch 26 in step S7 as described above. Herein, an exemplified regional classification map is shown in FIG. 12. This regional classification map is eventually obtained by combining the control map for the forward clutch 51 of FIGS. 8 and 9 and the control map for the lockup clutch 26 of FIG. 10, where the whole area is classified into the plural regions A–F (six regions in the drawing) in advance based on the vehicle speed and the throttle-valve opening, one of parameters representing the engine load. The region G corresponding to the deceleration condition with extremely small throttle openings (i.e., fully closed or near a zero opening) and the non-driving region (parking or stopping region) N corresponding to conditions where P range or L range is selected are also shown here.

Namely, as described in FIG. 13, the region A is a region where the lockup clutch 26 is in the lockup state and the forward clutch 51 is in the slip state, which is apparent from the control map for the forward clutch 51 shown in FIGS. 8 and 9 and the control map for the lockup clutch 26 shown in FIG. 10. Accordingly, the drivability can be improved by the forward clutch 51 and the gas mileage can be improved by the lockup clutch 26, respectively.

Next, the region B is a region where both of the lockup clutch 26 and the forward clutch 51 are in the slip state. Accordingly, the drivability can be improved by the forward clutch 51 and both of the gas mileage and the drivability can be improved by the lockup clutch 26.

Next, the region C is a region where the lockup clutch 26 is in the converter state and the forward clutch 51 is in the slip state in the non-steady driving condition and in the weak coupling state in the steady driving condition. Accordingly, in both cases, the drivability can be improved by the forward clutch 51 and both of the gas mileage and the torque increase (aiming at increasing the driving power of the vehicle) can be attained by the lockup clutch 26.

Next, the region D is a region where the lockup clutch 26 is in the converter state and the forward clutch 51 is in the weak coupling state. Accordingly, the drivability can be improved by the forward clutch 51 and the torque increase (aiming at increasing the driving power of the vehicle) can be attained by the lockup clutch 26.

Next, the region E is a region where the lockup clutch 26 is in the slip state and the forward clutch 51 is in the weak coupling state. Accordingly, the drivability can be improved by the forward clutch 51 and both of the gas mileage and the drivability can be improved by the lockup clutch 26.

Further, the region F is a region where the lockup clutch 26 is in the lockup state and the forward clutch 51 is in the weak coupling state. Accordingly, the drivability can be improved by the forward clutch 51 and the gas mileage can be improved by the lockup clutch 26.

Further, the region G is, like the region A, a region where the lockup clutch 26 is in the lockup state and the forward clutch 51 is in the slip state. Accordingly, the drivability can be improved by the forward clutch 51 and the gas mileage can be improved by the lockup clutch 26.

Further, the non-driving region N is a region where the lockup clutch 26 is in the lockup state and the forward clutch 51 is in the release (unlocked) state. Accordingly, the driving-force transmission is cut off by the forward clutch 51 and prompt starting of the vehicle can be attained by the lockup clutch 26.

Again, returning to the flowcharts of FIG. 5, the control unit 100 determines whether the vehicle is under gear shift or not in step S9, after classifying the vehicle driving condition in step S8 as described above. Herein, when the answer is NO, namely the vehicle is not at the gear shift timing, the sequence proceeds to step S10 and then the control unit 100 controls the forward clutch 51 and the lockup clutch 26 according to the classified regions based on the content of FIG. 13. When the answer is YES, namely the vehicle is under gear shift, it proceeds to step S11 and the control unit 100 executes the gear shift control.

Herein, in the gear shift control of step S1 (particularly, the gear shift between 3rd and 4th gears executed by the forward clutch 51), the forward clutch 51 is slip-controlled to attain the gear shift and the lockup clutch 26 is slip-controlled to absorb the shift shock (herein, this kind of associated slip control is not encompassed by the scope of the present invention).

Meanwhile, when the answer is YES in step S2, namely the non-driving range of P or N range is selected, the sequence proceeds to step S12, where the vehicle driving condition is classified into the non-driving region (parking or stopping region) N. It further proceeds to step S10, where the control unit 100 controls the forward clutch 51 and the lockup clutch 26 according to the region N based on the content of FIG. 13. When the answer is YES, or the vehicle is under deceleration condition with non-depressed accelerator pedal, the vehicle driving condition is classified into the deceleration region G with extremely small throttle-valve opening (i.e., fully closed or near a zero opening). Then, the sequence proceeds to step S9, and when it is determined that the vehicle is not under gear shift, it proceeds to step S10, where the control unit 100 controls the forward clutch 51 and the lockup clutch 26 according to the region G based on the content of FIG. 13.

Figure 6:
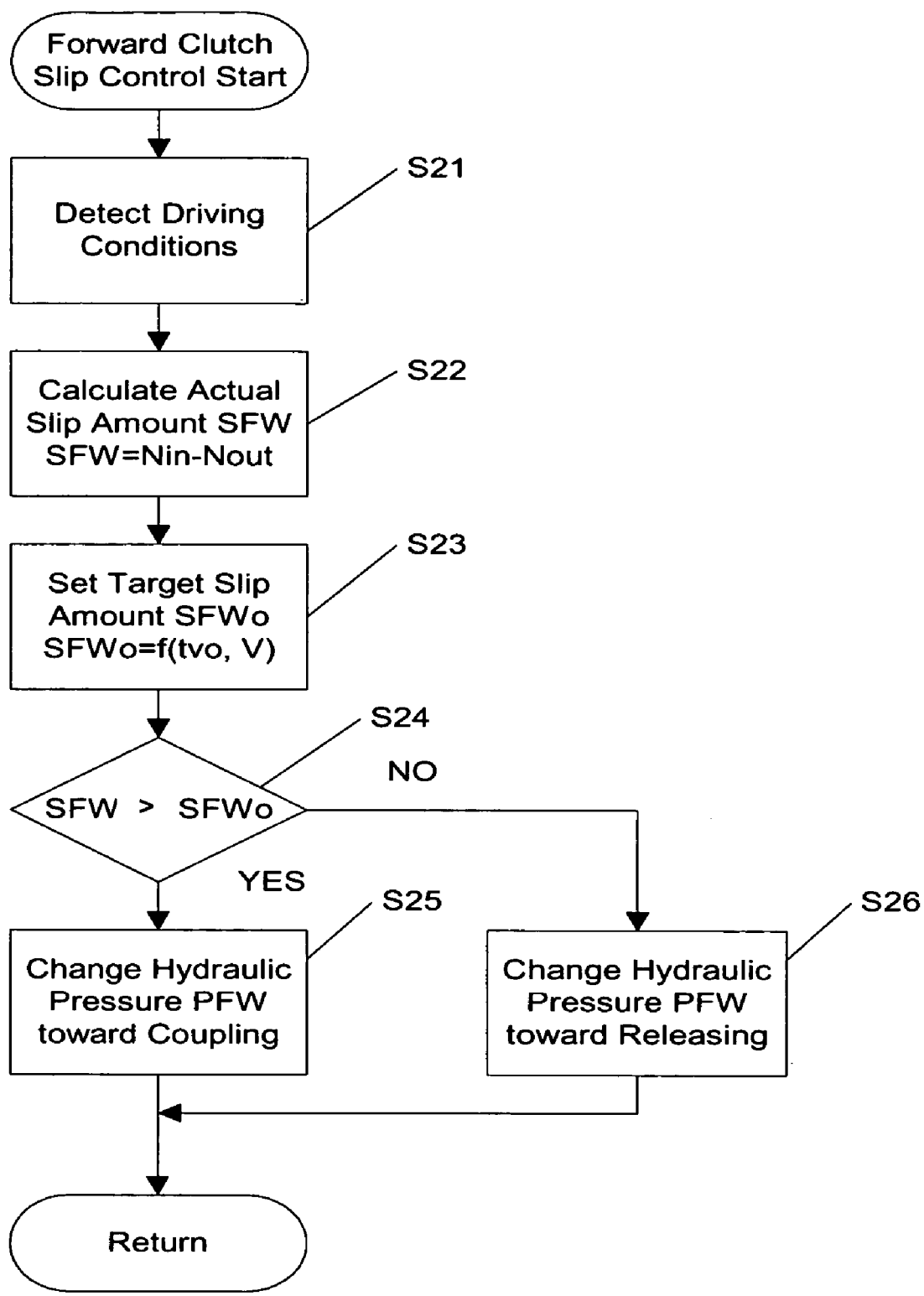
FIG. 6 is an exemplified flowchart for the slip control of the forward clutch.
Figure 7:
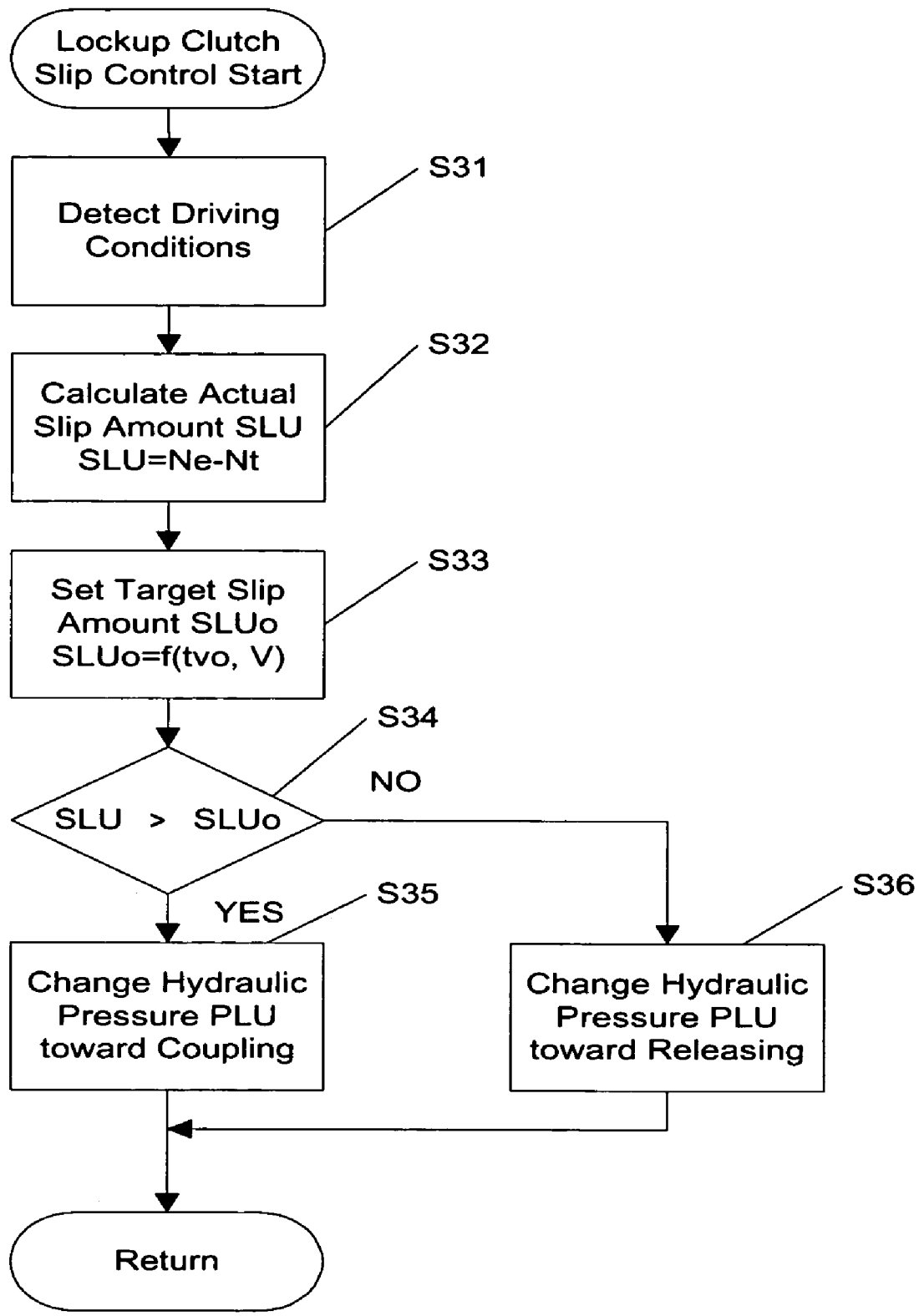
FIG. 7 is an exemplified flowchart for the slip control of the lockup clutch.

When the forward clutch 51 and the lockup clutch 26 are slip-controlled in the slip region in step S10, the slip controls for them are executed respectively according to respective exemplified flowcharts shown in FIGS. 6 and 7. First, in the control of the forward clutch 51, the control unit 100 detects the vehicle driving condition based on signals of the sensors and switches 101–108 in step S21 of FIG. 6, and then it calculates an actual slip amount (degree) SFW in step S22. Here, the actual slip amount SFW is a value obtained by subtracting an output rotational speed Nout of the forward clutch 51 (i.e., a rotational speed of the sun gear 31 of the first planetary gear mechanism 30: which is obtained by a rotational speed and a gear ratio of the output gear 13) from an input rotational speed Nin of the forward clutch 51 (i.e., turbine speed Nt).

Next, a target slip amount (degree) SFWo is set based on the throttle-valve opening tvo and the vehicle speed V in step S23. Herein, the target slip amount SFWo is configured such that the greater the throttle-valve opening tvo or the vehicle speed V is, the smaller its amount is.

Subsequently, it is determined whether the actual slip amount SFW is greater than the target slip amount SFWo or not in step S24. When it is greater, the control pressure (outside connecting hydraulic pressure) PFW is changed (increased) so as to make the forward clutch 51 be coupled in step S25. When it is smaller, the control pressure (outside connecting hydraulic pressure) PFW is changed (decreased) so as to make the forward clutch 51 be to released (uncoupled) in step S26.

Meanwhile, in the control of the lockup clutch 26, the control unit 100 detects the vehicle driving condition based on signals of the sensors and switches 101–108 in step S31 of FIG. 7, and then it calculates an actual slip amount (degree) SLU in step S32. Here, the actual slip amount SLU is a value obtained by subtracting an output rotational speed of the lockup clutch 26 (i.e., turbine speed Nt) from an input rotational speed of the lockup clutch 26 (i.e., engine speed Ne).

Next, a target slip amount (degree) SLUo is set based on the throttle-valve opening tvo and the vehicle speed V in step S33. Herein, the target slip amount SLUo is configured such that the greater the throttle-valve opening tvo or the vehicle speed V is, the greater its amount is.

Subsequently, it is determined whether the actual slip amount SLU is greater than the target slip amount SLUo or not in step S34. When it is greater, the control pressure (releasing pressure) PLU is changed (decreased) so as to make the lockup clutch 26 be coupled in step S35. When it is smaller, the control pressure (releasing pressure) PLU is changed (increased) so as to make the lockup clutch 26 be released (uncoupled) in step S36.

Figure 14:
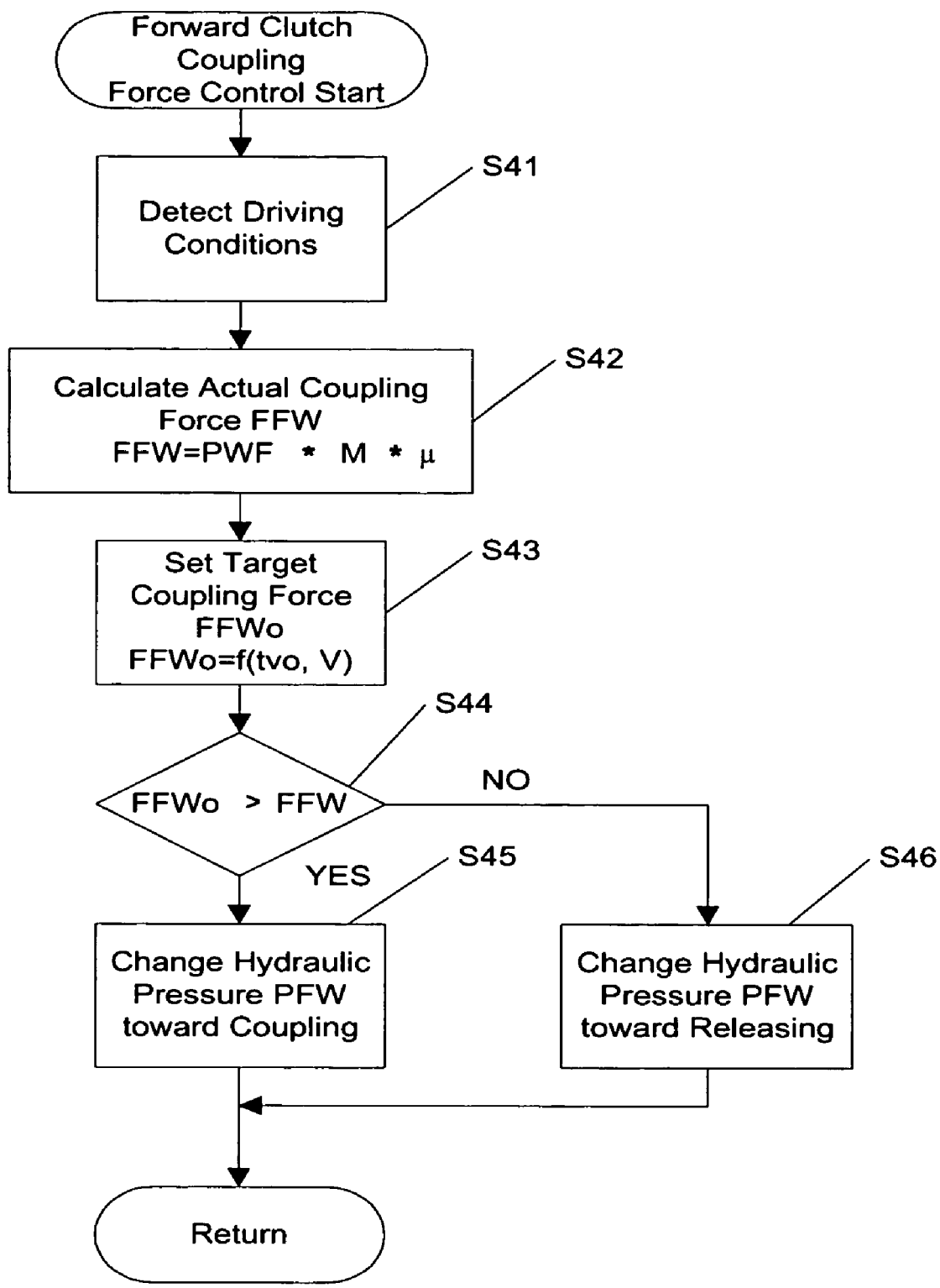
FIG. 14 is an exemplified flowchart for a connecting force control of the forward clutch.

Herein, the coupling force of the forward clutch 51 may be controlled as shown in FIG. 14. Namely, at first the control unit 100 detects the vehicle driving condition based on signals of the sensors and switches 101–108 in step S41, and then it calculates a coupling force FFW in step S42. Here, the actual coupling force FFW is a value obtained by multiplying a hydraulic pressure acting on the forward clutch 51 (i.e., outside coupling hydraulic pressure PFW) by a frictional area M of the frictional coupling elements 513 . . . 513 and a frictional coefficient μ of the frictional coupling elements 513.513.

Next, a target coupling force FFWo is set based on the throttle-valve opening tvo and the vehicle speed V in step S43. Herein, the target coupling force FFWo is configured such that the greater the throttle-valve opening tvo or the vehicle speed V is, the greater its force is.

Subsequently, it is determined whether the target coupling force FFWo is greater than the actual coupling force FFW or not in step S44. When it is greater, the control pressure (outside coupling hydraulic pressure) PFW is changed (increased) so as to make the forward clutch 51 be coupled in step S45. When it is smaller, the control pressure (outside coupling hydraulic pressure) PFW is changed (decreased) so as to make the forward clutch 51 to be released in step S46.

As described above, the present embodiment provides a device in which two or more clutches 26, 51, . . . including mechanisms to change the transmitting torque from a power generating device (engine) continuously are arranged in series and the mount of the transmitting torque borne by respective clutches is changed according to the vehicle driving condition. Accordingly, this can improve both of the gas mileage (which is attained by reducing slip degrees of the frictional coupling elements 51, 53 and the lockup clutch 26) and the drivability (which is attained by increasing slip degrees of the frictional coupling elements 51, 53 and the lockup clutch 26 to the contrary), which tend to be contrary to each other, at a high level.

Particularly, the forward clutch 51, which is more responsive and more accurate than the lockup clutch 26 of the torque converter 20, is controlled accurately so as to slip in the region A. As a result, vibrations or noises which are apt to occur when the lockup clutch 26 is locked up during a vehicle starting or extremely slow-speed driving condition can be absorbed appropriately. Accordingly, the gas mileage can be improved, decreasing a slip loss of the torque converter 20. In contrast, the conventional device does not execute the slip control for the forward clutch 51 when the vehicle is under driving condition. Accordingly, in the conventional device, since the above-described vibrations and noises may occur if the lockup clutch 26 is locked up during the low vehicle-speed condition, the lockup clutch 26 is controlled to be locked-up or slip just only during the high vehicle-speed condition. As a result, a deterioration of gas mileage could not be avoided in the conventional device.

Further, controlling the lockup clutch 26 so as to be locked up and only the forward clutch 51 so as to slip may cause a lack of driving force when the load becomes a little higher especially in the region B. Accordingly, the lockup clutch 26 is also controlled so as to slip in the region B, thereby improving the lack of driving force with a torque ratio of the torque converter 20. Thus, improvement of gas mileage in the middle-load region and avoidance of deterioration of the vehicle driving can be attained. Also, the transitional movement from the converter region to the lockup region can be made smooth. In the conventional device, there was provided no region basically where both of the lockup clutch 26 of the torque converter 20 and the other frictional coupling elements such as the forward clutch 51 were controlled so as to slip. The conventional device just controlled the lockup clutch 26 to slip instantaneously to suppress the shift shock only when the vehicle was under gear shift condition.

Further, particularly, the forward clutch 51 is always maintained in the weak coupling state in the regions E and F. Accordingly, appropriate shock absorption can be attained by the slip of the highly-responsive and highly-accurate forward clutch 51 with respect to an instantaneous depression of the accelerator pedal, like so-called "tip in/out." Thus, shock can be suppressed and the deterioration of gas mileage can be prevented without providing an unnecessary releasing of the lockup clutch 26. The conventional device controlled the coupling force of the lockup clutch 26 delicately which was less responsive and had poor controllability. Accordingly, it was difficult to provide an accurate slip-control for such instantaneous condition like the "tip in/out" of the accelerator pedal and the shock occurred inevitably. Or, the deterioration of gas mileage or comfortable driving was brought about, having the lockup clutch 26 in the converter state. Or, a cost increase was brought about by using an expensive dumper for shock absorption.

Meanwhile, as shown in FIGS. 8 and 9, the slip region for controlling the forward clutch 51 at the specified slip state is set according to the throttle-valve opening and the vehicle speed. Accordingly, a wide range of slip control of the forward clutch 51 based on the throttle-valve opening and the vehicle speed can also improve the drivability effectively.

Further, when the vehicle is under non-steady driving condition, for example, under a transitional condition, such as vehicle starting or acceleration (step S6 of FIG. 5: see FIG. 9), the slip region is expanded compared with the steady driving condition (step S5 of FIG. 5: see FIG. 8). Thus, the forward clutch 51 is slip-controlled in the wider range and thereby the drivability can be improved more effectively.

Herein, the slip region is expanded only when the vehicle is under non-steady driving condition. Accordingly, since the forward clutch 51 is not slip-controlled unnecessarily during the steady driving condition, any problems due to the slip control such as deterioration of transmitting efficiency, a heat occurrence and a less durability of the frictional coupling elements can be avoided as much as possible.

Further, since the forward clutch 51 is slip-controlled in the low-load and low-speed region during the steady driving condition (see FIG. 8), the shock or vibration due to torque changing, which tends to occur and to be noticeable in this driving region, can be absorbed securely and appropriately. As a result, the drivability can be improved greatly.

Further, since the forward clutch 51 is also slip-controlled in the high-load region during the non-steady driving condition (see FIG. 9), the shock or vibration due to torque changing during transitional driving condition, which tends to occur in this driving region, can be absorbed securely and appropriately. As a result, the drivability can be also improved in this regard.

Herein, as shown by a reference L1 in FIG. 9, the greater the throttle-valve opening is, i.e., the greater the depressed amount of the accelerator pedal by a driver aiming at a prompt acceleration is, at the lower vehicle speed the slip control (active slip control with the target slip degree) is made inactive to make the forward clutch 51 to be coupled (the weak coupling state: aiming at zero of the target slip degree). Thus, the transmitting efficiency can improve and the proper acceleration can be attained. Although the function of shock absorption by the slip control reduces, this may not cause a big problem because the shock is not apt to be noticeable during the high-load driving condition.

Conventionally, when the creeping force is cut off by slipping or releasing the forward clutch 51, for example, during a vehicle stop at a D range, the forward clutch 51 is coupled immediately when the vehicle starts or accelerates subsequently. As a result, the shock occurs often. Now, the device of the present embodiment, as shown in FIG. 9 (FIG. 12), makes the forward clutch 51 slip actively at the target slip degree in the slip regions A, B, C during the non-steady driving condition, and when a required torque increases, it makes also the lockup clutch 26 of the torque converter 20 slip according to the required torque (FIG. 10). Accordingly, the lack of torque can be compensated by the increase of torque ratio. Additionally, the vehicle accelerating response can be improved by characteristics of the above-described line L1 where the forward clutch 51 is so controlled to be apt to rather be coupled for aiming at the quick acceleration than slip for shock absorption (smoothness: drivability) when the driver depresses the accelerator pedal greatly. Further, such a prompt connection of the forward clutch 51 can ensure a reliability and a durability of the forward clutch 51. Conversely, during the low-load driving condition, the forward clutch 51 is coupled slowly slipping, giving priority to the shock absorption (smoothness: drivability).

In this case, it is preferred that the slip region (A, B or A, B, and C) is configured such that the greater the throttle-valve opening is (i.e., the higher the engine load is), the smaller the slip degree of the forward clutch 51 is. This is because making the slip degree of the forward clutch 51 small during the high-load driving condition can avoid the problems of deterioration of transmitting efficiency, the heat occurrence and the less durability of the friction elements, which are apt to be noticeable during the high-load driving condition. Further, this is because, conversely, making the slip degree of the forward clutch 51 great during the low-load driving condition can avoid the problems of the shock and vibration due to torque changing, which are apt to be noticeable during the low-load driving condition.

Further, particularly, since the forward clutch 51 is controlled so as to slip in the whole vehicle-speed area during the deceleration region G (see FIGS. 8 and 9), a prompt start and execution of a fuel cut can be attained, preventing a shock from occurring at a back out from the steady or accelerating condition. In the conventional device, as shown in FIG. 11, since the lockup clutch 26, which is less responsive and has poor controllability, was controlled so as to slip in the partial vehicle-speed area, it was difficult to execute the fuel cut without generating the shock. Particularly, such shock tends to be noticeable (passengers feel such shock easily) during the low vehicle-speed driving condition, and therefore the slip control of the forward clutch 51 executed during the deceleration driving condition should have an increased effect.

Although the forward clutch 51 was used as a frictional coupling element for being an object for the slip control in the present embodiment, the 3–4 clutch 53 may be used instead of or along with the forward clutch 51 as described above. Further, the slip control according to the present invention can be applied to not only the frictional coupling element for gear shifting described above but a starting clutch or the like.

Further, although the automatic transmission 10 was used as a transmission in the present embodiment, a continuously variable transmission may be used instead of the automatic transmission 10. In this case, the forward-backward switching clutch or the like can be used as a frictional coupling element for being an object for the slip control. Additionally, a mode-changing clutch, such as a low-mode clutch and a high-mode clutch, can be used in the continuously variable transmission enabling a geared neutral. Any other additional modification may be applied within the scope of the present invention.

As described above in detail by using the preferred embodiments, the present invention can improve both of gas mileage and drivability at a high level by associating the slip control of the frictional coupling element with the slip control of the lockup clutch of the hydraulic transmission device in wide range, which are respectively provided on the driving-power transmitting path between the engine and the driving wheel and adaptive to control their slip states between their input elements and their output elements. The present invention has a utility in a large variety of technical fields of the transmission, such as the automatic transmission and the continuously variable transmission applied for the automotive vehicle and the like.

What is claimed is:

1. A transmission control device including a frictional coupling element and a lockup clutch of a hydraulic transmission device, which are provided on a driving-power transmitting path between an engine and a driving wheel and adaptive respectively to control a slip state between an input element and an output element thereof, comprising:

first control means for controlling a slip state of the frictional coupling element;

second control means for controlling a slip state of the lockup clutch;

driving condition detecting means for detecting a driving condition of a vehicle;

classification means for classifying the vehicle driving condition detected by said driving condition detecting means into a region;

determination means for determining when the vehicle is not at a gear shift timing; and association control means for executing a control to associate said first control means with said second control means according to a classification result by said classification means, when it is determined by said determination means that the vehicle is not at the gear shift timing, wherein said association control means control said first control means so as to make the frictional coupling element in a slip state and control said second control means so as to make the lockup clutch in a lockup state, when the vehicle driving condition is classified into a first region by said classification means, said first region correspondintto a vehicle driving condition where an engine load is lower than a specified engine load in a relatively low-load area and a vehicle speed is lower than a specified vehicle speed in a relatively low-speed area, and said association control means control said first control means so as to make the frictional coupling element in the slip state and control said second control means so as to make the lockup clutch in a converter state, when the vehicle driving condition is classified into a third region by said classification means, said third region corresponding to a vehicle driving condition where the engine load is higher than a specified engine load in a relatively high-load area and the vehicle speed is lower than the specified vehicle speed in the relatively low-speed area.

2. The transmission control device of claim 1, wherein said association control means control said first control means so as to make the frictional coupling element in a slip state and control said second control means so as to make the lockup clutch in a slip state, when the vehicle driving condition is classified into a second region by said classification means, said second region corresponding to a vehicle driving condition where the engine load is higher than the specified engine load in the relatively low-load area and lower than the specified engine load in the relatively high-load area and the vehicle speed is lower than the specified vehicle speed in the relatively low-speed area.

3. The transmission control device of claim 1, wherein said association control means control said first control means so as to make the frictional coupling element in the slip state and control said second control means so as to make the lockup clutch in the lockup state, when the vehicle driving condition is classified into a region corresponding to a vehicle deceleration condition where the engine load is extremely low regardless of the vehicle speed.

4. The transmission control device of claim 1. wherein said association control means control said first control means so as to make the frictional coupling element in a weak coupling state where a slip of the frictional coupling element is allowed substantially only when an instantaneous torque changing occurs and control said second control means so as to make the lockup clutch in the converter state, when the vehicle driving condition is classified into a region conesponding to a vehicle driving condition where the engine load is higher than the specified engine load in the relatively high-load area and the vehicle speed is higher than a specified vehicle speed in a relatively high-speed area.

5. The transmission control device of claim 1, wherein there is provided driving condition determining means for determining whether the driving condition of the vehicle detected by said driving condition detecting means is a steady driving condition or a non-steady driving condition, and said association control means control said first control means in said first region so as to make the frictional coupling element in the slip state by adjusting a slip degree of the frictional coupling element at a specified target slip when it is determined by said driving condition determining means that the driving condition is the steady driving condition, while said association control means control said first control means in said first region so as to make the frictional coupling element in a weak coupling state where a slip of the frictional coupling element is allowed substantially only when an instantaneous torque changing occurs when it is determined by said driving condition determining means that the driving condition is the non-steady driving condition.

6. The transmission control device of claim 1, wherein said association control means control said first control means so as to make the frictional coupling element in a weak coupling state where a slip of the frictional coupling element is allowed substantially only when an instantaneous torque changing occurs and control said second control means so as to make the lockup clutch in the lockup state, when the vehicle driving condition is classified into a region corresponding to a vehicle driving condition where the engine load is lower than the specified engine load in the relatively low-load area and the vehicle speed is higher than a specified vehicle speed in a relatively high-speed area.

7. The transmission control device of claim 1, wherein said association control means control said first control means so as to make the frictional coupling element in a weak coupling state where a slip of the frictional coupling element is allowed substantially only when an instantaneous torque changing occurs and control said second control means so as to make the lockup clutch in a slip state, when the vehicle driving condition is classified into a region corresponding to a vehicle driving condition where the engine load is higher than the specified engine load in the relatively low-load area and the vehicle speed is higher than a specified vehicle speed in a relatively high-speed area.

8. A transmission control device including a frictional coupling element and a lockup clutch of a hydraulic transmission device, which are provided on a driving-power transmitting path between an engine and a driving wheel and adaptive respectively to control a slip state between an input element and an output element thereof, comprising:

a first control device adaptive to control a slip state of the frictional coupling element;

a second control device adaptive to control a slip state of the lockup clutch;

a driving condition detecting sensor adaptive to detect a driving condition of a vehicle; and a control unit which receives a detecting signal of said driving condition detecting sensor and generates a control signal to said first and second control devices, wherein said control unit includes classification section for classifying the vehicle driving condition detected by said driving condition detecting sensor into a region, determination section for determining when the vehicle is not at a gear shift timing, and association control section for executing a control to associate said first control device with said second control device according to a classification result by the classification section when the vehicle is not at the gear shift timing, wherein said first control device is controlled so as to make the frictional coupling element in a slip state and said second control device is controlled so as to make the lockup clutch in a lockup state, when the vehicle driving condition is classified into a first region corresponding to a vehicle driving condition where an engine load is lower than a specified engine load in a relatively low-load area and a vehicle speed is lower than a specified vehicle speed in a relatively low-speed area, and said first control device is controlled so as to make the frictional coupling element in the slip state and said second control device is controlled so as to make the lockup clutch in a converter state, when the vehicle driving condition is classified into a third region corresponding to a vehicle driving condition where the engine load is higher than a specified engine load in a relatively high-load area and the vehicle speed is lower than the specified vehicle speed in the relatively low-speed area.

9. The transmission control device of claim 8, wherein said first control device is controlled so as to make the frictional coupling element in a slip state and said second control device is controlled so as to make the lockup clutch in a slip state, when the vehicle driving condition is classified into a second region corresponding to a vehicle driving condition where the engine load is higher than the specified engine load in the relatively low-load area and lower than the specified engine load in the relatively high-load area and the vehicle speed is lower than the specified vehicle speed in the relatively low-speed area.

* * * * *